US010713204B2

(12) United States Patent
Burks et al.

(10) Patent No.: US 10,713,204 B2
(45) Date of Patent: Jul. 14, 2020

(54) CONTROLLING A MODE OF COMMUNICATION BETWEEN A HOST COMPUTER AND A DETACHABLE PERIPHERAL DEVICE

(71) Applicant: HEWLETT-PACKARD DEVELOPMENT COMPANY, L.P., Houston, TX (US)

(72) Inventors: Ricky T Burks, Houston, TX (US); Shang-Te Chiang, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/093,963

(22) PCT Filed: Jul. 28, 2016

(86) PCT No.: PCT/US2016/044366
§ 371 (c)(1),
(2) Date: Oct. 15, 2018

(87) PCT Pub. No.: WO2018/022050
PCT Pub. Date: Feb. 1, 2018

(65) Prior Publication Data
US 2019/0138483 A1    May 9, 2019

(51) Int. Cl.
*G06F 13/40* (2006.01)
*G06F 1/16* (2006.01)
(Continued)

(52) U.S. Cl.
CPC ........ *G06F 13/4081* (2013.01); *G06F 1/1632* (2013.01); *G06F 3/0231* (2013.01);
(Continued)

(58) Field of Classification Search
CPC .. G06F 3/0231; G06F 13/4081; G06F 1/1632; H04W 4/80; H04W 76/14; H04L 12/12; H04L 13/00
See application file for complete search history.

(56) References Cited

U.S. PATENT DOCUMENTS 5,889,964 A * 3/1999 Cho ...................... G06F 1/1632
710/304
8,621,123 B2 * 12/2013 Caballero ................. G06F 3/00
710/62

(Continued)

OTHER PUBLICATIONS

Alpatronix KX101 Removable Bluetooth Keyboard Folio Leather Case for iPad mini 1, 2, 3 and 4, < http://alpatronix.com/products/kc-apx-101 >.

*Primary Examiner* — Henry Tsai
*Assistant Examiner* — Christopher Daley
(74) *Attorney, Agent, or Firm* — Trop, Pruner & Hu P.C (57) ABSTRACT

A technique includes communicating data between a host computer and a peripheral device. The peripheral device is docked to the host computer, and the communicating comprises using a wired mode of communication. The technique includes detecting undocking of the peripheral device from the host computer; and in response to the detection of the undocking, automatically transitioning from using the wired mode of communication to using a wireless mode of communication to communicate data between the host computer and the peripheral device.

14 Claims, 5 Drawing Sheets

(51) Int. Cl.
  *H04L 12/12*    (2006.01)
  *G06F 13/00*    (2006.01)
  *H04W 76/14*    (2018.01)
  *H04W 4/80*     (2018.01)
  *G06F 3/023*    (2006.01)

(52) U.S. Cl.
  CPC .............. *G06F 13/00* (2013.01); *H04L 12/12* (2013.01); *H04W 4/80* (2018.02); *H04W 76/14* (2018.02)

(56) References Cited

U.S. PATENT DOCUMENTS

| | | | |
|---|---|---|---|
| 8,838,073 B2* | 9/2014 | Sangster | G06F 3/0231 455/412.1 |
| 8,896,541 B2 | 11/2014 | Huang | |
| 9,542,203 B2* | 1/2017 | Hassan | G06F 1/30 |
| 2002/0038400 A1 | 3/2002 | Fukushima | |
| 2003/0021082 A1* | 1/2003 | Lu | G06F 1/1616 361/679.4 |
| 2004/0001307 A1* | 1/2004 | Takakusaki | G06F 1/1616 361/679.17 |
| 2009/0058707 A1 | 3/2009 | Craze et al. | |
| 2011/0098087 A1 | 4/2011 | Tseng | |
| 2012/0322376 A1 | 12/2012 | Couse et al. | |
| 2013/0311801 A1* | 11/2013 | Kong | G06F 1/26 713/320 |
| 2014/0330998 A1* | 11/2014 | Dees | H04W 4/70 710/303 |
| 2015/0277492 A1* | 10/2015 | Chau | G06F 1/1632 361/679.43 |
| 2016/0014545 A1 | 1/2016 | Tian et al. | |
| 2016/0095145 A1* | 3/2016 | Gupta | H04W 8/005 455/41.2 |
| 2019/0086955 A1* | 3/2019 | Li | G06F 1/1618 |

* cited by examiner

CONTROLLING A MODE OF COMMUNICATION BETWEEN A HOST COMPUTER AND A DETACHABLE PERIPHERAL DEVICE

BACKGROUND

A portable computing device, such as a tablet computer, may have an associated Bluetooth keyboard that is wirelessly paired to the computing device. In this manner, a radio of the keyboard may communicate with a radio of the computing device for purposes of communicating input from the keyboard, such as key strokes, trackpad movements, and so forth.

DETAILED DESCRIPTION

A host computer (a tablet computer, a smartphone, a notebook computer, and so forth) may have a detachable keyboard (a Bluetooth keyboard, for example) that wirelessly communicates input data (data representing keystrokes, trackpad movements, mouse button actuations, and so forth) to the computer. For purposes of setting up the wireless connection between the host computer and the keyboard, a process called "pairing" may be used.

The host computer may have a docking connector that mates with a docking connector of the keyboard to physically attach the keyboard to the computer. Although physically attached together, the keyboard and the host computer may rely on a paired wireless connection for purposes of communicating the input data from the keyboard to the computer. Although a user may expect the keyboard to function when the user docks, or physically attaches, the keyboard to the host computer, the keyboard may not function unless the keyboard is wirelessly paired with the computer. As such, using a detachable keyboard with a host computer may be confusing and burdensome for the user.

In accordance with example implementations that are described herein, the mode of communication between a detachable peripheral device (a keyboard, a mouse, and so forth) and a host computer is automatically regulated, depending on whether the peripheral device is attached, or docked, to the host computer or detached, or undocked, from the host computer. In this context, the "automatic" regulation refers to the host computer and/or the peripheral device taking actions to control the mode of communication in response to the peripheral device being attached to or detached from the host computer.

More specifically, in accordance with example implementations, the peripheral device and the host computer may communicate using either a wired mode of communication or a wireless mode of communication. In accordance with example implementations, when the peripheral s attached, or docked, to the host computer, a connection management engine of the host computer sets up a wired mode of communication between the host computer and the peripheral. Moreover, in accordance with example implementations, when the peripheral is detached, or undocked, from the host computer, the connection management engine sets ups a wireless mode of communication between the host computer and the peripheral.

In this context, a "wired mode of communication" refers to the host computer and the peripheral device communicating using signaling on at least one wired connection between the host computer and the peripheral device. For example, the wired connection may include the connection of one or multiple physical terminals of a docking connector of the host computer with one or multiple physical terminals of a mating docking connector of the keyboard. In accordance with example implementations, the physical terminal(s) may be associated with a serial bus, and the host computer and the peripheral device may be agents of the serial bus. As such, in accordance with example implementations, the wired mode of communication may involve a serial bus interface of the host computer communicating, via the connected physical terminal connections, with a serial bus interface of the peripheral device. In accordance with example implementations, the wired mode of communication includes using signaling that complies with the Universal Serial Bus (USB) or Inter-Integrated Circuit ($I^2C$) specification. In accordance with further implementations, the wired mode of communication may involve using a serial bus other than a USB or $I^2C$ bus, and the wired mode of communication may involve the use of a bus other than a serial bus.

In accordance with example implementations, the "wireless mode of communication" refers to the host computer and the peripheral device communicating using wirelessly signaling. For example, in accordance with example implementations, a radio of the host computer may communicate with a radio of the peripheral device using wireless communication that complies with the Bluetooth standard promulgated by the Bluetooth Special Interest Group. In this manner, the host computer may be a Bluetooth master device, and the peripheral device may be a Bluetooth slave device. For purposes of initially setting up a Bluetooth-based wireless connection, the host computer and the peripheral device perform a process called "pairing." In the pairing process, the keyboard and the host computer authenticate each other to become bonded, or paired. After being paired, the peripheral device and the host computer may transition from the wired mode of communication to the wireless mode of communication, as described herein, without undergoing the pairing process.

In accordance with further implementations, the wireless mode of communication may involve the use of wireless signaling other than Bluetooth-based communication. For example, in accordance with further implementations, the wireless mode of communication may involve the use of signaling that complies with the Institute of Electrical and Electronics Engineers (IEEE) 802.11 standards (commonly called "WiFi"), near field communication (NFC), and so forth.

In accordance with example implementations, regardless of whether the peripheral device is wirelessly paired with the host computer or not, the peripheral device may be used with the host computer by merely attaching the device to the computer. For example, a keyboard may be newly purchased and used for the first time (i.e., the keyboard may have just been taken "out of the box"). The keyboard may be docked to a computer and used to supply input to the computer without a user first taking actions to wirelessly pair the keyboard to the computer. The user may therefore have a seamless keyboard experience, as the keyboard works as intuitively expected by the user.

Figure 1:
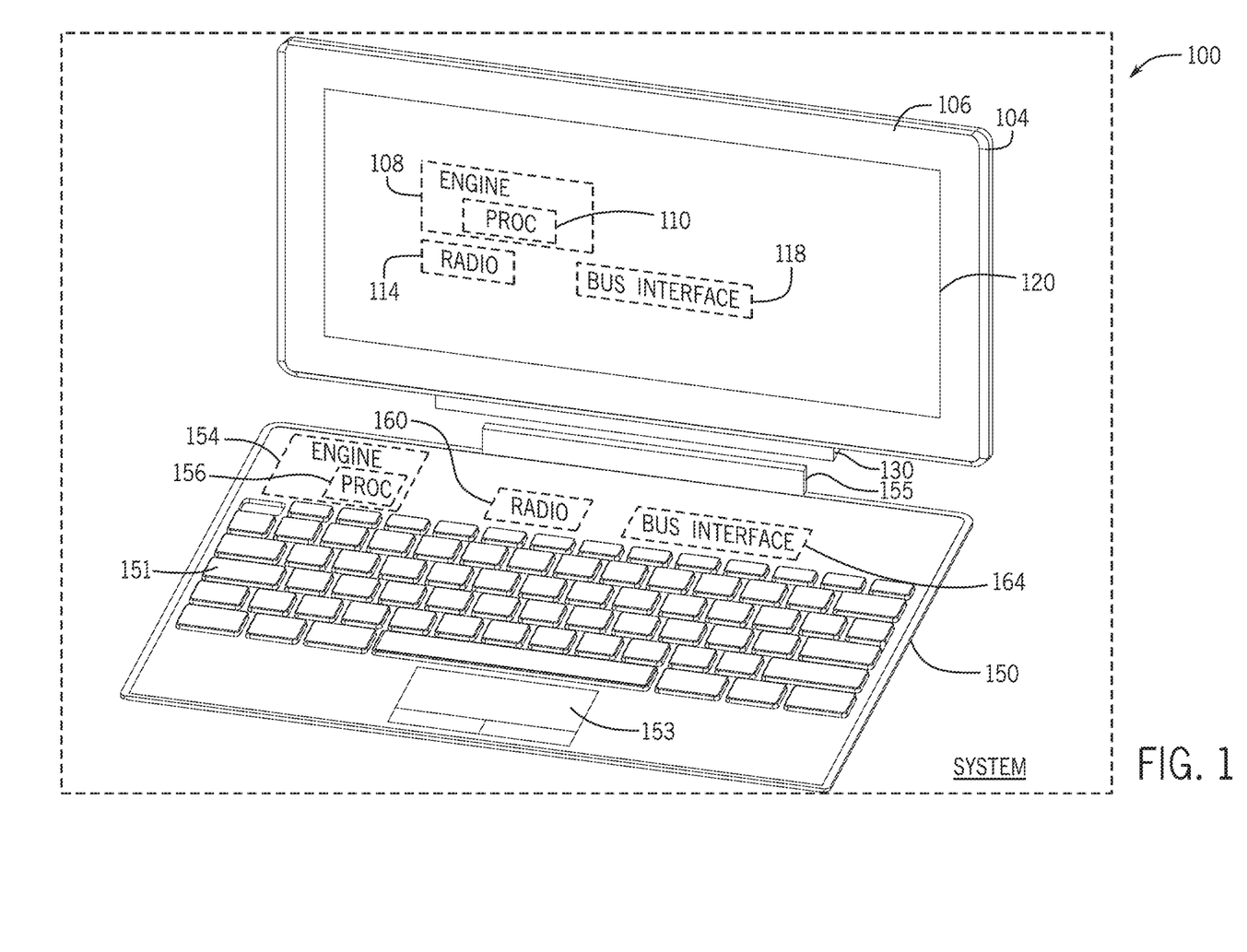
FIG. 1 is a schematic diagram of a system that includes a tablet computer and a detachable keyboard according to an example implementation.

Referring to FIG. 1, in accordance with example implementations, a computer system 100 may include a tablet computer 104 (an example of a host computer) and a detachable keyboard 150 (an example of a peripheral). The keyboard 150 may communicate with the tablet computer 104 using one of two modes of communication: 1. a wired mode of communication in which a bus interface 164 (a serial bus interface, such as a USB or I²C bus interface, for example) of the keyboard 150 communicates input data (data representing key strokes, trackpad movements, mouse button "clicks," and so forth) with a serial bus interface 118 (a USB or I²C bus interface, for example) of the tablet computer 104 when the keyboard 150 is docked to the tablet computer 104; and 2. a wireless mode of communication in which a radio 160 (a Bluetooth radio, for example) of the keyboard 150 wirelessly communicates input data with a radio 114 (a Bluetooth radio, for example) of the tablet computer 104.

FIG. 1 depicts the keyboard 150 for a state of the computer system 100 in which the keyboard 150 is detached, or undocked, from the tablet computer 104. In other words, a docking connector 155 of the keyboard 150 is detached, or undocked, from a mating docking connector 130 of the tablet computer 104. In accordance with example implementations, electrical contacts, or terminals, of the docking connector 130 mate with electrical contacts of the docking connector 155 of the keyboard to form corresponding wired connections between the keyboard 150 and the tablet computer 104 to communicate, for example, signals and power. One or multiple wired connections formed by the docking of the keyboard 150 and the tablet computer 104 may communicate one or multiple signals associated with a serial bus, such as the USB or I²C bus.

One of multiple wired connections formed by the docking of the keyboard 150 to the tablet computer 104 may be used to alert the tablet computer 150 to an undocking event (the occurrence of the keyboard 150 being detached, or undocked, from, the tablet computer 104) or a docking event (the occurrence of the keyboard 150 being attached, or docked to, the tablet computer 104). For example, in accordance with example implementations, circuitry of the tablet computer 104 may generate interrupts in response to voltage transitions on a docking sense contact of the docking connector 130, which occur due to the docking or undocking of the docking connector 155.

In accordance with example implementations, the tablet computer 104 includes a connection management engine 108, which may be a processor-based engine (as depicted by a processor 110 of the engine 108 in FIG. 1). The connection management engine 108 automatically transitions between wired and wireless modes of communication the keyboard 150 and the tablet computer 104 in response to docking and undocking events.

More specifically, in accordance with example implementations, in response to a docking event, the connection management engine 108 automatically sets up a wired connection between the keyboard 150 and the tablet computer 104 so that keyboard input data is communicated to the tablet computer 104 using the bus interfaces 118 and 164. Moreover, in accordance with example implementations, in response to an undocking event, the connection management engine 108 automatically sets up a wireless connection between the keyboard 150 and the tablet computer 104 so that keyboard input data is communicated to the tablet computer 104 using wireless transmissions via the radios 114 and 160.

The connection management engine 108, in accordance with example implementations, may communicate with a connection management engine 154 of the keyboard 150 to set up the keyboard 150 for the wireless and wired modes of communication. The connection management engine 154, in accordance with example implementations, may be a processor-based engine 154 (as depicted by a processor 156) in FIG. 1.

Depending on the particular implementation, the connection management engine 108 of the tablet computer 104 may be a master, which controls the connection management engine 154 of the keyboard 150 as a slave for purposes of instructing the engine 154 to set up the keyboard 150 for wired or wireless communication with the tablet computer 104; or the connection management engine 154 of the keyboard 150 may operate autonomously to detect the docking status of the keyboard 150 and control whether the keyboard 150 is set up for wired or wireless communications. In accordance with further example implementations, the connection management engine 154 of the keyboard 150 may be a master, which controls the connection management engine 108 of the tablet computer 104 as a slave for purposes of instructing the engine 108 to set up the tablet computer 104 for wired or wireless communication with the keyboard 150.

In accordance with example implementations, before the keyboard 150 may be used to wirelessly communicate data with the tablet computer 104, the keyboard 150 and the tablet computer 104 are first wirelessly bonded, or paired. The wireless pairing of the radios 116 and 160 (and thus, the corresponding pairing of the keyboard 150 and the tablet computer 104) may occur many different ways, depending on the particular implementation. For example, the wireless pairing may be initiated in response to a human user depressing a designated pairing key or button on the keyboard 150. In accordance with some implementations, the connection management engine 108 may use a Simple Secure Pairing (SSP) protocol in a process that does not involve the user entering a pass key via the keyboard 150. In accordance with further implementations, the initial wireless pairing may involve the connection management engine 108 causing a display 120 of the tablet computer 140 to display a numeric code for the user to enter via keys 151 of the keyboard 150. In accordance with further example implementations, the tablet computer 104 and the keyboard 150 may be pre-paired by the manufacturer or seller of the tablet computer 104 and keyboard 150.

In accordance with example implementations, the keyboard 150 and the tablet computer 104 remain bonded, or paired, independently from the communication mode (wireless or wired) being used, unless the user undertakes action(s) on the tablet computer 104 to remove the pairing. Thus, in accordance with example implementations, the mode of communication between the tablet computer 104 and the keyboard 150 may transition between the wired and wireless modes, with the pairing remaining intact.

Among its other features, the tablet computer 104 may, in general, include a housing 106 in which the connection management engine 108, radio 114 and bus interface 118 are disposed. The housing 106 includes that includes a region for a display 120; openings for power buttons, camera(s), speaker(s), control buttons; and an opening through which the docking connector 130 extends. Moreover, the tablet computer 104 may include various other software and/or hardware components, as further described herein.

In addition to the docking connector 155, the connection management engine 154, the radio 160 and the bus interface 164, the keyboard 150 may include various other features, such as, for example, keys 151 and a trackpad 153 with associated mouse buttons.

Figure 2:
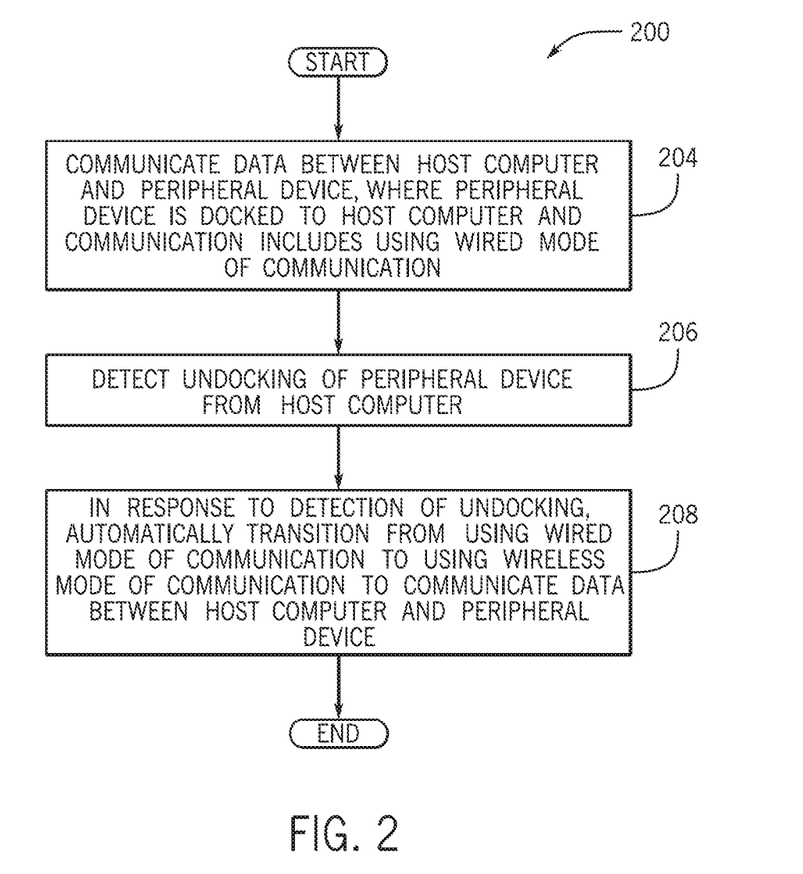
FIG. 2 is a flow diagram depicting a technique to transition from a wired mode of communication between a peripheral device and a host computer to a wireless mode of communication between the peripheral device and the host computer in response to the undocking of the peripheral device from the host computer.

Thus, referring to FIG. 2, in accordance with example implementations, a technique 200 includes communicating (block 204) data between a host computer and a peripheral device, where the peripheral device is docked to the host computer and the communication involves using a wired mode of communication. The technique 200 includes detecting (block 206) undocking of the peripheral device from the host computer; and in response to the detection of the undocking, automatically transitioning from using the wired mode of communication to using the wireless mode of communication to communicate data between the host computer and the peripheral device.

Figure 3:
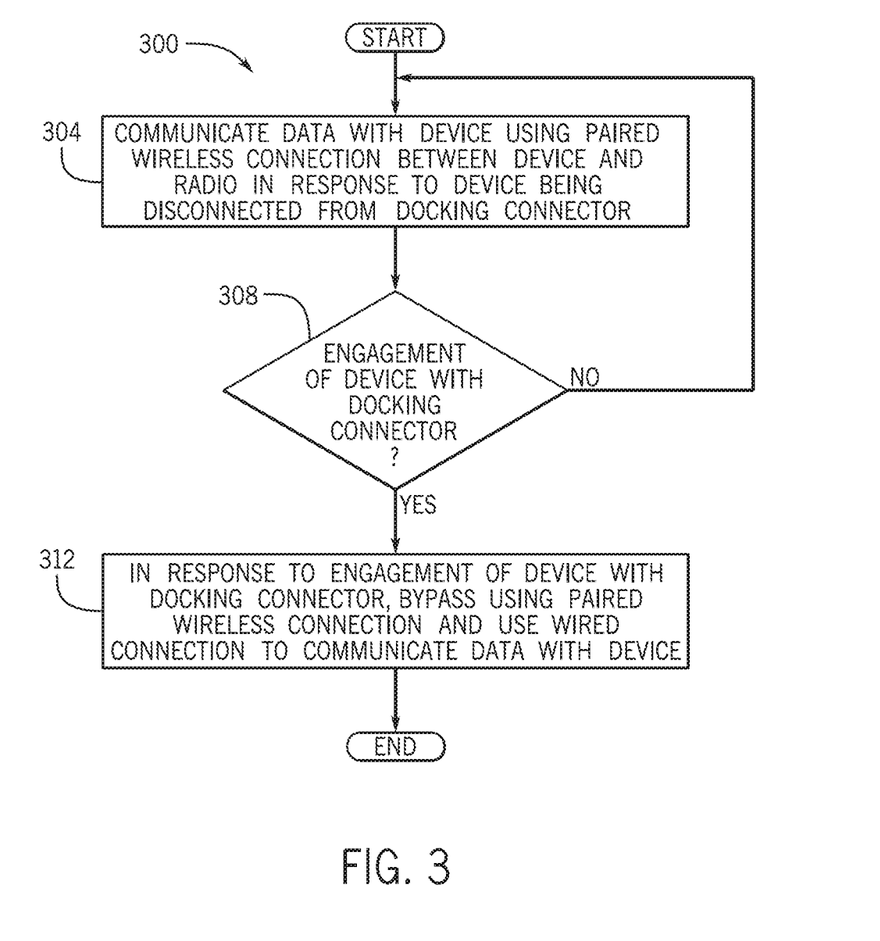
FIG. 3 is a flow diagram depicting a technique to transition from a wireless mode of communication between the peripheral device and the host computer to a wired mode of communication between the peripheral device and the host computer in response to the peripheral device being docked to the host computer.

Moreover, referring to FIG. 3, in accordance with example implementations, a technique 300 includes a host computer communicating (block 304) with a peripheral device using a paired wireless connection between the peripheral device and a radio of the host computer in response to the peripheral device being disconnected from a docking connector. The technique includes the host computer determining (decision block 308) whether the peripheral device has engaged with docking connector of the host computer, and if not, communication continues using the paired wireless connection, pursuant to block 304. In response to a determination that the peripheral device has engaged the docking connector, pursuant to decision block 308, the technique 300 includes the host computer bypassing (block 312) using the paired wireless connection and using a wired connection to communicate data with the peripheral device.

Therefore, in accordance with example implementations, even if the peripheral device and the host computer are communicating using a wireless mode of communication, the mode is changed to a wired mode of communication when the peripheral device is attached, or docked, to the host computer. A wired mode of communication between the peripheral device and the host computer may be beneficial for certain operations of the host computer. For example, a user may use an attached keyboard to perform a lower level basic input/output system (BIOS) operation on the host computer, and this BIOS operation may not support the wireless mode of communication. As another example, the host computer may transition to a power conservation state (transition from a fully powered up state to a hibernation or sleep state, for example). The host computer may be able to wake up in response to a key stroke or trackpad input from a keyboard that communicates with the host computer using a wired mode of communication, but the host computer may be unable to wake up in response to keyboard input if the keyboard communicates with the host computer using a wireless mode of communication.

Figure 4:
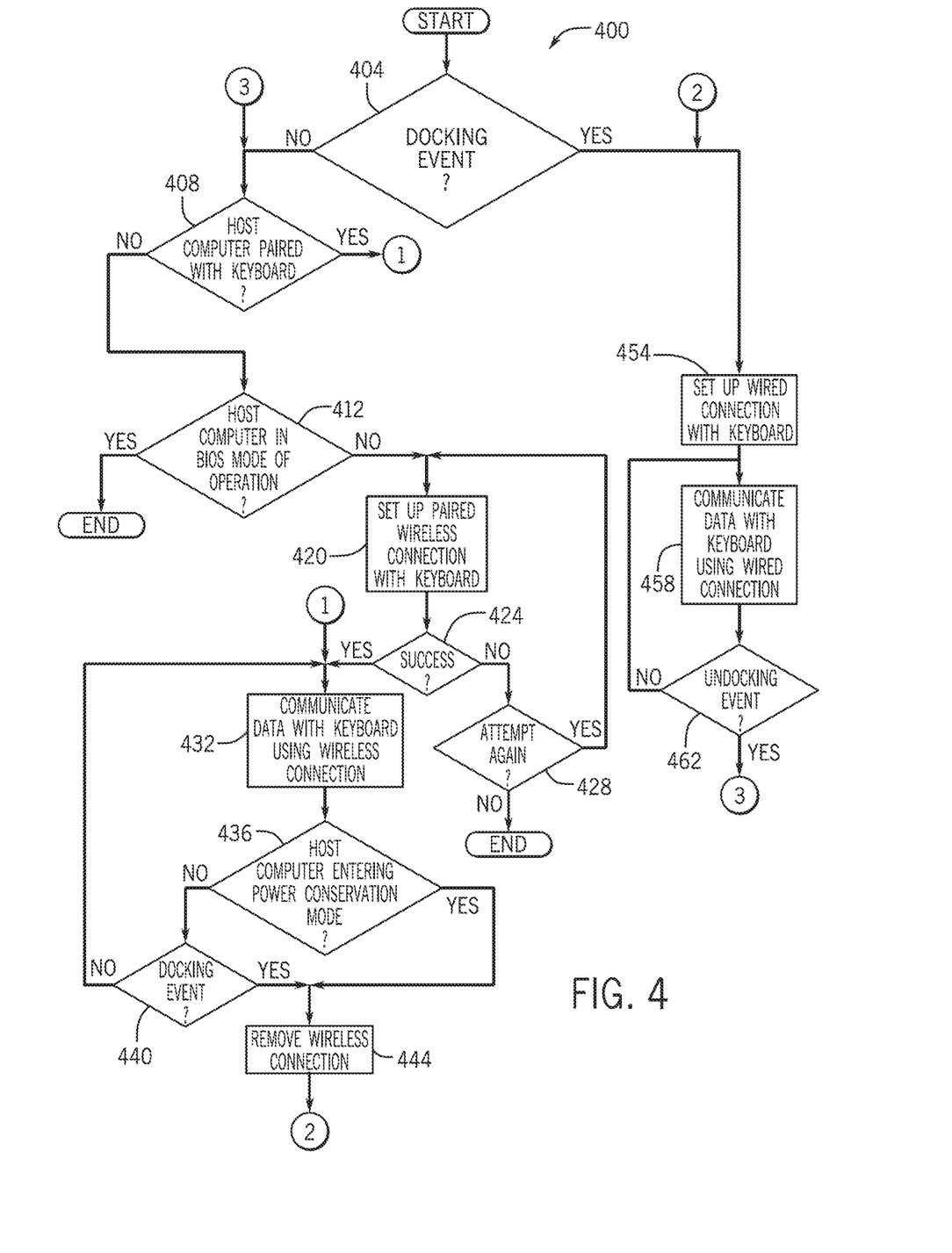
FIG. 4 is a flow diagram depicting a technique to control wireless and wired connections between a host computer and a keyboard according to an example implementation.

In accordance with some implementations, the connection management engine 108 (FIG. 1) may perform a technique 400 that is depicted in FIG. 4. The technique 400 assumes that a keyboard (the example peripheral device) is "out of the box," batteries have been installed in the keyboard, and the keyboard is wirelessly discoverable by the host computer. Referring to FIG. 4 in conjunction with FIG. 1, the technique 400 includes the connection management engine 108 determining (decision block 404) whether a docking event has occurred. If not, the connection management engine 108 determines (decision block 408) whether the host computer has been wirelessly paired with the keyboard.

If the host computer has not been wirelessly paired with the keyboard, then the connection management engine 108 determines (decision block 412) whether the host computer is operating in a BIOS mode of operation, which does not support wireless communication. If so, then the connection management engine 108 may not take further action. In accordance with further example implementations, in response to determining the host computer is operating in a BIOS mode of operation, the connection management engine 108 may set up the wired mode of communication so that the keyboard may be used if attached to the host computer.

If, pursuant to decision block 412, the connection management engine 108 determines that the host computer is not operating in a BIOS mode operation, then the connection management engine 108 wirelessly pairs the keyboard and host computer, pursuant to block 420. If the pairing is unsuccessful, then one or multiple attempts may be performed (as depicted in decision blocks 424 and 428).

If the wireless pairing is successful (decision block 424) or the host computer and keyboard are already paired (decision block 408), then the connection management engine 108 sets up the wireless mode of communication so that data is communicated using a wireless connection, pursuant to block 432.

In accordance with some implementations, the connection management engine 108 may transition the keyboard to the wired mode of operation in response to the host computer entering into a power conservation mode. Therefore, in accordance with some implementations, in response to the connection management engine 108 determining (decision block 436) that host computer is about to transition to a power conservation mode, the connection management engine 108 removes the wireless connection (block 444) and sets up a wired connection with the keyboard (block 454). Therefore, the user may dock the keyboard with the host computer and use input from the keyboard for purposes of thereafter waking up the computer from the power conservation mode, as described herein.

Otherwise, in accordance with example implementations, if the host computer is not transitioning to a power conservation mode and a docking event (decision block 440) has not been detected, the wired mode of communication remains, and data is communicated from the keyboard to the host computer using a wired connection, pursuant to block 432. As depicted in FIG. 4, upon determining a docking event has occurred (decision block 440), the connection management engine 108 may remove the wireless connection (block 444) and set up the wired connection with the keyboard, pursuant to block 454.

After setting up the wired connection with the keyboard, data may be communicated from the keyboard to the host computer, pursuant to block 458, until the connection management engine 108 determines (decision block 462) that an undocking event has occurred. When this occurs, control transitions to decision block 408, as described above.

Figure 5:
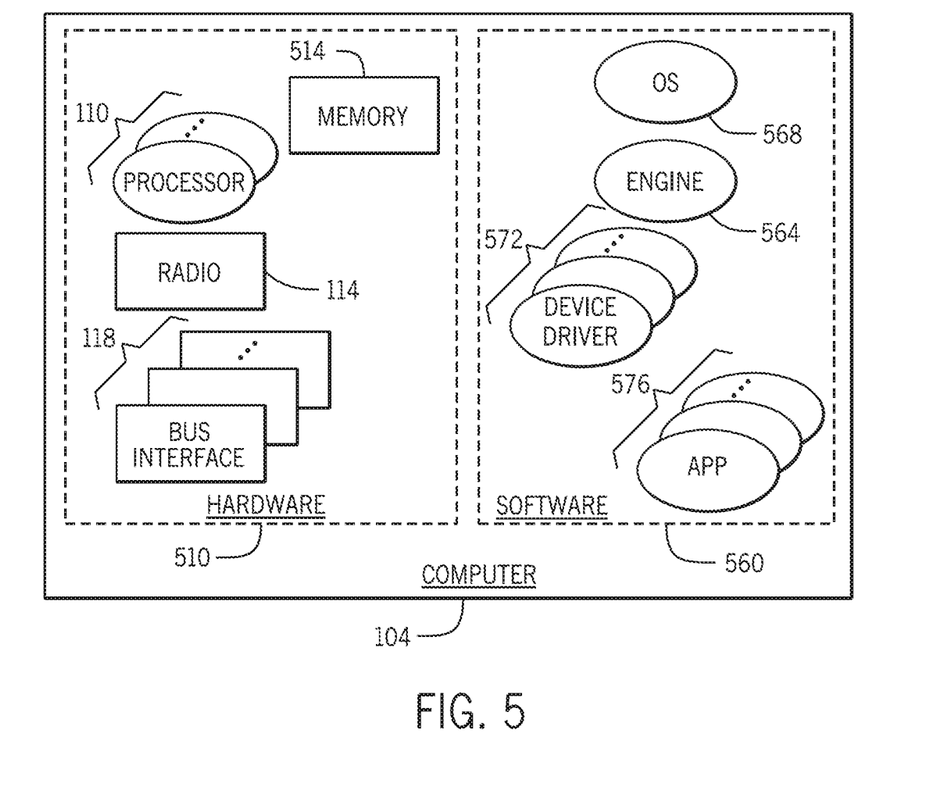
FIG. 5 is a schematic diagram of a host computer according to an example implementation.

Referring to FIG. 5 in connection with FIG. 1, in accordance with some implementations, the tablet computer 104 (an example of a host computer) may include hardware 510 and software 560. In this manner, the hardware 510 may include one or multiple processors 110, the radio 114, and one or multiple bus interfaces 118. The memory 514 contains a non-transitory storage medium that is formed from semiconductor storage devices, memristors, phase change devices, volatile memory devices, non-volatile memory devices, and so forth.

In accordance with example implementations, the tablet computer 104 includes instructions 564, which when executed by one or multiple processor(s) 110 cause the processor(s) 110 to form the connection management engine 108. Moreover, in accordance with example implementations, the software 560 may include sets 572 of machine executable instructions that when executed by the processor(s) 110 cause the processor(s) 110 to form one or multiple device drivers and sets 576 of machine executable instruction that when executed by the processor(s) 110 cause the processor(s) 110 to form one or multiple applications. Moreover, in accordance with example implementations, the tablet computer 104 may include various other sets of machine executable instructions, such as instructions 568, which when executed by the processor(s) 110 cause the processor(s) 110 to form an operating system. In accordance with some implementations, the machine executable instructions described herein may be stored in a non-transitory computer readable storage medium, such as the memory 514.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
communicating data between a host computer and a peripheral device, wherein the peripheral device comprises a keyboard, the peripheral device is docked to the host computer, and communicating data between the host computer and the peripheral device comprises communicating keyboard input data from the keyboard to the host computer using a wireless mode of communication;
detecting a transition of the host computer from operating in a first power conservation state associated with a first power consumption to operating in a second power conservation state associated with a second power consumption less than the first power consumption; and
in response to the detection of the transition, automatically transitioning from using the wireless mode of communication to communicate the keyboard input data from the keyboard to the host computer to using a wired mode of communication to communicate the keyboard input data from the keyboard to the host computer.

2. The method of claim 1, wherein using the wireless mode of communication comprises using a paired wireless connection between the host computer and the peripheral device.

3. The method of claim 1, further comprising:
detecting the docking of the peripheral device to the host computer; and
in response to the detection of the docking, automatically transitioning from using the wireless mode of communication to using the wired mode of communication.

4. The method of claim 3, further comprising:
in response to the detection of the docking, bypassing a paired wireless connection between the host computer and the peripheral device.

5. The method of claim 1, further comprising:
determining whether the host computer is performing a basic input/output system (BIOS) function associated with using input provided by the keyboard; and
initiating transitioning from using the wireless mode of communication to using the wired mode of communication based at least in part on the determining.

6. An apparatus, comprising:
a housing;
a radio contained in the housing;
a processor contained in the housing; and
a docking connector to connect a device to the housing, wherein the processor:
communicates data with the device using a paired wireless connection between the device and the radio;
detects a transition of the apparatus from operating in a first power conservation state associated with a first power consumption to operating in a second power conservation state associated with a second power consumption less than the first power consumption; and
in response to the detection, removes the wireless connection and uses a wired connection to communicate the data with the device.

7. The apparatus of claim 6, wherein the docking connector comprises a least one electrical connection pin associated with the wired connection.

8. The apparatus of claim 6, further comprising:
a touchscreen, and wherein the docking connector comprises a keyboard connector.

9. The apparatus of claim 6, further comprising a first serial bus interface contained in the housing, wherein:
the wired connection comprises a serial bus;
the first serial bus interface is an agent on the serial bus;
the device comprises a second serial bus interface; and
the second serial bus interface is an agent on the serial bus.

10. The apparatus of claim 6, wherein the processor determines whether the processor is performing a basic input/output system (BIOS) function associated with an input provided by the device, and in response to the determination, removes the wireless connection and uses the wired connection to communicate the data with the device.

11. An article comprising a non-transitory computer readable storage medium to store instructions that, when executed by a computer, cause the computer to:
communicate keyboard input data from a keyboard to the computer using a wireless mode of communication;
detect a transition of the computer from operating in a first power conservation state associated with a first power consumption to operating in a second power conservation state associated with a second power consumption less than the first power consumption; and
in response to the detection, automatically transition the computer from using the wireless mode of communication to using a wired mode of communication in which the keyboard input data is communicated using a serial bus.

12. The article of claim 11, wherein the instructions, when executed by the computer, further cause the computer to, in response to the keyboard being attached to the computer, configure the computer from using the wireless mode of communication to using the serial bus to communicate the keyboard input data.

13. The article of claim 11, wherein the instructions, when executed by the computer, further cause the computer to determine whether the computer is using a basic input/output system (BIOS) function associated with input provided by the keyboard, and in response to the determination, initiate the automatic transition from the computer using the wireless mode of communication to using the wired mode of communication.

14. The article of claim 11, wherein the instructions, when executed by the computer, further cause the computer to pair the computer with the keyboard using a Simple Secure Pairing (SSP) protocol.

* * * * *